United States Patent
Knowlton et al.

(10) Patent No.: US 6,860,951 B2
(45) Date of Patent: Mar. 1, 2005

(54) GAS GENERATING COMPOSITIONS

(75) Inventors: Gregory D. Knowlton, Chandler, AZ (US); Christopher P. Ludwig, Fountain Hill, AZ (US); Daniel V. Haun, Chandler, AZ (US)

(73) Assignee: Talley Defense Systems, Inc., Mesa, AZ (US)

( * ) Notice: Subject to any disclaimer, the term of this patent is extended or adjusted under 35 U.S.C. 154(b) by 15 days.

(21) Appl. No.: 09/798,548

(22) Filed: Mar. 2, 2001

(65) Prior Publication Data

US 2001/0020504 A1 Sep. 13, 2001

Related U.S. Application Data

(63) Continuation-in-part of application No. 09/114,196, filed on Jul. 13, 1998, now Pat. No. 6,235,132, which is a continuation-in-part of application No. 08/706,198, filed on Aug. 30, 1996, now Pat. No. 5,780,768, which is a continuation-in-part of application No. 08/402,103, filed on Mar. 10, 1995, now Pat. No. 5,551,725.

(51) Int. Cl.[7] .......................... C06B 31/02; C06B 29/22
(52) U.S. Cl. .......................................... 149/61; 149/76
(58) Field of Search ........................... 149/61, 76, 19.1

(56) References Cited

U.S. PATENT DOCUMENTS

| | | | | |
|---|---|---|---|---|
| 3,723,205 A | * | 3/1973 | Scheffee ........................ | 149/76 |
| 3,749,019 A | * | 7/1973 | Hancock et al. ............ | 102/337 |
| 3,862,866 A | * | 1/1975 | Timmerman et al. ......... | 149/85 |
| 3,883,373 A | | 5/1975 | Sidebottom .................... | 149/6 |
| 3,986,908 A | * | 10/1976 | Grebert et al. ............. | 149/19.7 |
| 4,214,438 A | * | 7/1980 | Hamilton et al. ............. | 149/82 |
| 4,632,714 A | | 12/1986 | Abegg et al. ................. | 149/2 |
| 4,664,674 A | * | 5/1987 | Oftedal et al. ............... | 149/20 |
| 4,673,527 A | | 6/1987 | Goudy, Jr. et al. .......... | 252/181 |
| RE32,584 E | | 1/1988 | Pietz ........................... | 423/351 |
| 4,812,308 A | | 3/1989 | Winston et al. ............... | 424/52 |
| 4,865,635 A | | 9/1989 | Cuevas ........................ | 55/276 |
| 4,907,819 A | | 3/1990 | Cuevas ....................... | 280/736 |
| 4,923,212 A | | 5/1990 | Cuevas ....................... | 280/736 |
| 5,125,684 A | * | 6/1992 | Cartwright ................. | 149/19.7 |
| 5,348,596 A | * | 9/1994 | Goleniewski et al. ...... | 149/19.6 |
| 5,401,340 A | | 3/1995 | Doll et al. .................... | 149/22 |
| 5,403,035 A | * | 4/1995 | Hamilton ................... | 149/19.7 |
| 5,411,615 A | | 5/1995 | Sumrail et al. ............... | 149/47 |
| 5,429,691 A | | 7/1995 | Hinshaw et al. ............. | 149/45 |
| 5,439,537 A | | 8/1995 | Hinshaw et al. ............. | 149/22 |
| 5,500,059 A | | 3/1996 | Lund et al. ................. | 149/19.1 |
| 5,501,823 A | | 3/1996 | Lund et al. ................... | 264/3.1 |
| 5,531,941 A | | 7/1996 | Poole ......................... | 264/3.4 |
| 5,538,567 A | | 7/1996 | Henry, III et al. ............ | 149/18 |
| 5,544,687 A | * | 8/1996 | Barnes et al. ................. | 149/83 |
| 5,545,272 A | | 8/1996 | Poole et al. .................. | 149/48 |
| 5,551,725 A | | 9/1996 | Ludwig et al. ............. | 280/737 |
| 5,578,789 A | * | 11/1996 | Oberth ....................... | 149/19.9 |
| 5,610,444 A | * | 3/1997 | Austruy et al. ............... | 264/3.3 |
| 5,641,938 A | | 6/1997 | Holland et al. ............... | 149/48 |
| 5,656,793 A | * | 8/1997 | Ochi et al. .................... | 149/37 |
| 5,780,768 A | | 7/1998 | Knowlton et al. ............ | 149/36 |
| 5,827,996 A | * | 10/1998 | Yoshida et al. ............... | 149/61 |
| 5,861,571 A | * | 1/1999 | Scheffee et al. ............. | 149/76 |
| 5,883,330 A | * | 3/1999 | Yoshida ....................... | 149/83 |
| 5,898,126 A | * | 4/1999 | Yoshida ....................... | 149/46 |
| 5,936,195 A | * | 8/1999 | Wheatley .................... | 149/19.1 |
| 6,036,894 A | * | 3/2000 | Brown et al. ............... | 149/19.4 |
| 6,113,713 A | * | 9/2000 | Blomquist .................... | 149/45 |
| 6,120,058 A | * | 9/2000 | Mangum et al. ........... | 149/19.7 |
| 6,235,132 B1 | * | 5/2001 | Knowlton et al. ......... | 149/19.7 |

OTHER PUBLICATIONS

U.S. Appl. No. 09/114,196, filed Jun. 1998, Knowlton et al.

* cited by examiner

Primary Examiner—Aileen Felton
(74) Attorney, Agent, or Firm—Fitzpatrick, Cella, Harper & Scinto

(57) ABSTRACT

A low-solids gas generating composition, which is a mixture of a fuel selected for the group consisting of cellulose, cellulose acetate, hexamine, and mixtures thereof, and an oxidizer selected from the group consisting of ceric ammonium nitrate, lithium nitrate, lithium perchlorate, sodium perchlorate, phase stabilized ammonium nitrate, a combination of ammonium nitrate with potassium nitrate, potassium perchlorate, or mixtures thereof, such that the combination is a solid solution, a mixture of ammonium perchlorate and at least one alkali metal salt, and mixtures thereof. The combination of ammonium nitrate with other salts in solid solution is intended to phase stabilize the ammonium nitrate. The oxidizer-fuel mixture is within about 4 percent of stoichiometric balance. Useful alkali metal salts include lithium carbonate, lithium nitrate, sodium nitrate, potassium nitrate, and mixtures thereof. The preferred oxidizers for the gas generating composition of the invention are ceric ammonium nitrate, lithium nitrate, lithium perchlorate, sodium perchlorate, a mixture of ammonium perchlorate and at least one alkali metal salt, and mixtures thereof. In addition, the gas generating composition may include an energizing agent, such as RDX or HMX. The gas generating composition of the invention may further comprise sub-micron fumed silica to reduce moisture contamination and serve as a processing and powder flow aid and/or a binder, and may be in the form of pressed pellets, grains, or granules.

31 Claims, No Drawings

GAS GENERATING COMPOSITIONS

This application is a continuation-in-part of U.S. application Ser. No. 09/114,196, filed Jul. 13, 1998 now U.S. Pat. No. 6,235,132, which is a continuation-in-part of U.S. application Ser. No. 08/706,198, filed Aug. 30, 1996, now U.S. Pat. No. 5,780,768 the teaching of which are incorporated herein in their entirety by reference.

FIELD OF THE INVENTION

The invention generally relates to pyrotechnic materials, comprising at least one fuel and at least one oxidizer. The pyrotechnic materials of the invention are useful in most pyrotechnic applications requiring a mixture of a fuel and oxidizer, but are particularly useful in gas generating compositions or gas generants, such as those used in "air bag" passive restraint systems, that have a low solids output on combustion.

BACKGROUND OF THE INVENTION

Gas generators, i.e., devices for producing gas, have become more commonplace in the field of pyrotechnics over the last 20 years, mainly due to the increased use of automotive air bags. Typically, an automotive air bag gas generator, which is typically referred to as an inflator, contains a gas generant, i.e., a pyrotechnic material that generates a gas during combustion. The gas generant in the inflator in a vehicle air bag passive restraint system is typically a pyrotechnic material comprising a fuel and an oxidizer or, in the case of mono-propellants, such as nitrocellulose, a fuel having an integral oxidizer. The gas generant must provide the gas required to deploy and fill the air bag in a matter of milliseconds when an actuation signal is received by the system, and the air bag inflator must perform properly during an accident at any point in the useful life of the vehicle. The fact that an inflator may be required to rapidly fill an air bag after 10 or more years of storage places a number of constraints on inflator design, which are dictated by the required performance of the restraint system, i.e., the time required for the full deployment of the air bag, reliability (including environmental exposure and storage life), the safety and health of vehicle occupants, air bag volume, and the interface between the restraint system and the vehicle. The inflator specification that results from these constraints defines the form, fit, and function criteria for the inflator.

An example of a filterless inflator is provided in parent U.S. Pat. No. 5,551,725, which is incorporated herein by reference. The inflator described in the above identified application comprises a contained volume, a source of gas for producing an inflation gas, an initiating system for initiating the conversion of the source of gas to the inflation gas, and an exhaust orifice that provides an exhaust path and controls the flow of the inflation gas. The source of gas is typically a mixture of a fuel and oxidizer that is stable, and will not ignite until the initiating system ignites the mixture to produce the inflation gas.

A typical inflator functions by converting an electrical or mechanical initiating signal into the generation of a precisely controlled quantity of gas at precisely controlled rates. Generally, this is accomplished by an inflator pyrotechnic train, which comprises an "initiation" device called an initiator, an enhancer charge, and a main gas generant charge, all of which are contained in the body of the inflator. In response to the initiating signal, the initiator ignites and produces a hot gas, particulates, and/or flame. The flame output of the initiator is typically small, and often requires enhancement to ignite the main gas generant charge. The initiator flame ignites the enhancer charge, which is a hot burning propellant, and augments the initiator output sufficiently to ignite the main gas generant charge. Once ignited, the gas generant burns to produce the hot gas required at a rate sufficient to fill the air bag module in the required time.

The restraint system performance is dictated, in part, by the need to fill and deploy the air bag in a matter of milliseconds. Under representative conditions, only about 60 milliseconds elapse between the primary impact of a vehicle in an accident and the secondary impact of the driver or passenger (herein after "an occupant") with a portion of the vehicle interior. Therefore, a very rapid generation or release of gas is required to fill the bag, and prevent the secondary impact. The amount and rate of gas generation or release is determined by the volume of the air bag required for the vehicle and the time between primary and secondary impacts.

In addition, to meet environmental and occupant safety and health requirements, the inflation gas produced by the inflator should be non-toxic and non-noxious when the inflator is functioned in an air bag module in a typical vehicle. The gas generated or released must also have a temperature that is sufficiently low to avoid burning the occupant and the air bag, and it must be chemically inert, so that the mechanical strength and integrity of the bag are not degraded by the gas.

The stability and reliability of an inflator gas generant over the life of the vehicle are extremely important. The gas generant must be stable over a wide range of temperature and humidity conditions, and should be resistant to shock, so that the propellant pellets, grains, granules, etc. maintain mechanical strength and integrity during the life of the vehicle.

Vehicle manufacturers have developed a number of quantitative tests to determine whether an air bag restraint system will operate reliably when needed during any part of a vehicle's useful life. Although these tests and the performance requirements that an inflator should meet in these tests vary somewhat from manufacturer to manufacturer, the design criteria of all the vehicle manufacturers are essentially the same.

In a typical prior art passive restraint system the inflation gas is nitrogen, which is produced by the decomposition reaction of a gas generant containing a metal azide, typically sodium azide ($NaN_3$). The metal azide is the fuel and the principal gas generating compound in the gas generant used in the inflator. A typical metal azide gas generant is disclosed in U.S. Reissue Pat. No. Re. 32,584.

The gas produced in sodium azide based inflators is relatively pure nitrogen. Because there is no carbon in the fuel, oxides of nitrogen, $NO_x$, can be controlled easily by running the propellant under slightly fuel rich conditions. In contrast, the combustion of gas generants containing carbon, nitrogen, and oxygen, when formulated to be fuel rich, results in the production of carbon monoxide (CO), a toxic gas. If excess oxygen is present in such a composition to assure the complete oxidation of CO to carbon dioxide, the excess oxygen will react with nitrogen at the propellant combustion temperature to form oxides of nitrogen, which can also be toxic. Therefore, the mixture of oxidizer and fuel must approach a stoichiometric balance in gas generants of this type to avoid the production of toxic gases.

Inflator designs based on sodium azide have been shown to meet the requirements of vehicle manufacturers, and are used today in most passive restraint systems. However, there are disadvantages to this technology, including the production of large quantities of hot, solid particulates during combustion, such as sodium oxide, a highly caustic material, which results in added complexity and cost in the inflator design. The relatively high toxicity of the raw sodium azide (oral rat $LD_{50}$ of about 45 mg/kg), which must be handled during the inflator manufacturing process, can also create a disposal problem at the end of the useful life of the vehicle.

Because typical gas generants used in inflators produce solid particulates, filters must be incorporated into the inflator to separate the hot particulates from the gas prior to exhausting the gas from the inflator into the air bag. Filters are required in virtually all driver and passenger side air bag inflators that incorporate purely pyrotechnic gas generants, including sodium azide based air bag inflators because of the significant amounts of solids produced during the decomposition of the oxidizer and the combustion of the fuel. The solids produced during the combustion of the gas generant are separated from the gas stream to prevent exposure of vehicle occupants to excessive or toxic levels of airborne particulates during and after air bag deployment. The need for filters, as well as the toxicity of the sodium azide, adds to the cost of producing a typical prior art inflator.

As a result of the problems associated with sodium azide based gas generants, there is movement away from sodium azide based technology to "non-azide" based technology, which uses gas generating compositions, i.e., gas generants, that are typically simple organic fuels, such as hydrocarbons, carbohydrates, or derivatives thereof used in concert with one of the more classic pyrotechnic oxidizer, such as potassium perchlorate, potassium nitrate, or strontium nitrate. These compositions have been used as gas generants in purely pyrotechnic inflators and as gas generants and heaters in hybrid inflators, which incorporate both a pyrotechnic element and stored pressurized gas. The main problem with compositions using these oxidizers is still the copious amount of solids produced by these oxidizers upon combustion. When used with a fuel which does not produce solids, the prior art non-azide gas generants are an improvement over sodium azide based generants, but still require extensive filtration prior to the gas exiting the inflator because of the particulates produced by the oxidizers. This results in an inflator that is larger and more expensive than would otherwise be necessary.

Attempts have been made to use ammonium nitrate with a phase stabilizer as an oxidizer, but, generally, these compositions do not hold up to the extensive thermal cycling that can occur in automotive applications. Ammonium perchlorate mixed with an alkali metal nitrate or carbonate in essentially equimolar amounts has also been used, where the alkali metal salt is added to neutralize the hydrogen chloride, HCl, produced by the combustion of the ammonium perchlorate. The resulting combination produces only 50 to 60 percent of the solids produced by the more traditional oxidizers. When ammonium perchlorate/alkali metal salt based compositions are used with a low solids fuel that requires very little oxygen to burn stoichiometrically, the result is a low solids producing gas generant that requires substantially less or even no filter when used in an automotive inflator. For example, U.S. Pat. No. 5,780,768 discloses a mixture of guanidine nitrate, ammonium perchlorate, and sodium nitrate that produces only about 12.5 percent solids upon combustion. This mixture has been successfully used in a driver side inflator without a filter, and is a dramatic improvement over more conventional technology. However, this composition still requires relatively high pressures to combust. A further reduction of solids produced from the unit, as well as a reduction in the combustion temperature, is also desirable.

"Hybrid" inflators that use stored pressurized gas for part of the inflator gas supply are another means used to control solid particulate production, since smaller amounts of solid particulate producing gas generant can be used to obtain the same inflator gas output. In addition, the stored pressurized gas, which is typically an inert gas mixed with oxygen to supplement combustion and decrease the level of toxics, cools the gas that flows from the inflator, and results in a greater degree of condensation and solidification within the inflator. Thus, the amount of particulates introduced into the air bag and the vehicle interior is reduced.

The combination of greater condensation of solids within the inflator and the reduction in the total amount of solids produced eliminates the need for filters in hybrid inflators. However, hybrid inflators are typically larger and heavier, and have decreased reliability resulting from storing a pressurized gas over the lifetime of the vehicle.

U.S. Pat. No. 5,538,567 discloses a gas generating propellant, which produces nitrogen, carbon dioxide, and steam on combustion, consisting essentially of guanidine nitrate, a flow enhancer, such as carbon black, a binder, such as calcium resinate, and an oxidizer selected from the group consisting of potassium perchlorate and ammonium perchlorate. The production of only nitrogen, carbon dioxide, steam, and minor amounts of hydrogen and carbon monoxide is disclosed. However, only a single composition comprising potassium perchlorate is exemplified. There is no example of compositions incorporating ammonium perchlorate, which produces significant quantities of hydrogen chloride (HCl) during combustion.

U.S. Pat. No. 5,545,272 discloses a gas generating composition consisting essentially of about 35 to 55 percent by weight nitroguanidine and about 45 to 65 percent by weight phase stabilized ammonium nitrate, and may include a flow enhancer or a molding facilitator. The phase stabilizer is typically a potassium salt. Although ammonium nitrate produces clean non-toxic gases, and is free of solids upon combustion, ammonium nitrate has a crystal transition or phase stability problem, resulting from the four phase transitions ammonium nitrate crystals undergo over the temperature range typically experienced in storage. Each of these transitions results in a change of crystal volume, which may cause a slow breakup of propellant grains during thermal cycling from high to low temperature. However, ammonium nitrate crystals can be "phase stabilized" using additives, such as potassium perchlorate and potassium nitrate. The effectiveness of these additives varies depending upon the particular additive used. However, most of the known additives useful as phase stabilizers produce solids upon combustion, and, thus, increase the production of solids by the propellant.

Therefore, a need exists for pyrotechnic materials that can be used as low solids producing gas generants that minimize or eliminate the need for inflator filters or other means for separating solids from the gases produced. The present invention provides such pyrotechnic materials.

SUMMARY OF THE INVENTION

The invention is directed to a low-solids gas generating composition, comprising a mixture of a fuel selected for the group consisting of cellulose, cellulose acetate, hexamine, and mixtures thereof, and an oxidizer selected from the group consisting of ceric ammonium nitrate, lithium nitrate, lithium perchlorate, sodium perchlorate, a combination of ammonium nitrate with potassium nitrate, potassium perchlorate, or mixtures thereof, such that the combination is a solid solution, a mixture of ammonium perchlorate and at least one alkali metal salt, and mixtures thereof, where the alkali metal salt is preferably, lithium carbonate, lithium nitrate, sodium nitrate, potassium nitrate, and mixtures thereof. The oxidizer-fuel mixture is within about 4 percent of stoichiometric balance, and produces no more than about 30 percent solids on combustion. The gas generating composition may further comprise at least one of sub-micron fumed silica, guanidine nitrate, nitroguanidine, and an energizing agent, such as, e.g., RDX or HMX. Preferably, the gas generant is in the form of pressed pellets, grains, or granules.

The preferred gas generating compositions of the invention include the following mixtures:

A mixture comprising cellulose and an oxidizer comprising a mixture of ammonium perchlorate and sodium nitrate, where the mixture preferably comprises from about 22 to about 28 percent cellulose and from about 72 to about 78 percent oxidizer, where the oxidizer comprises ammonium perchlorate and sodium nitrate in a mole ratio of about 1 mole of ammonium perchlorate to about 1 to about 4 moles of sodium nitrate;

A mixture comprising hexamine and an oxidizer comprising a mixture of ammonium perchlorate and sodium nitrate, where the mixture preferably comprises from about 14 to about 18 percent hexamine and from about 82 to about 86 percent oxidizer, wherein the oxidizer comprises ammonium perchlorate and sodium nitrate in a mole ratio of about 1 mole of ammonium perchlorate to about 1 to about 4 moles of sodium nitrate;

A mixture comprising cellulose acetate and an oxidizer comprising a mixture of ammonium perchlorate and sodium nitrate, where the mixture preferably comprises from about 20 to about 25 percent cellulose acetate and from about 75 to about 80 percent oxidizer, wherein the oxidizer comprises ammonium perchlorate and sodium nitrate in a mole ratio of about 1 mole of ammonium perchlorate to about 1 to about 4 moles of sodium nitrate;

A mixture comprising cellulose, guanidine nitrate, ammonium perchlorate, sodium nitrate, and silica, where the mixture preferably comprises 10 percent cellulose, 36 about percent guanidine nitrate, about 30.6 percent ammonium perchlorate, about 23.2 percent sodium nitrate, and about 0.2 percent silica;

A mixture comprising hexamine, guanidine nitrate, ammonium perchlorate, sodium nitrate, and silica, where the mixture preferably comprises about 10 percent hexamine, about 22.8 percent guanidine nitrate, about 38 percent ammonium perchlorate, about 28.9 percent sodium nitrate, and about 0.3 percent silica;

A mixture comprising cellulose acetate, guanidine nitrate, ammonium perchlorate, sodium nitrate, and silica, where the mixture preferably comprises about 10 percent cellulose acetate, about 33.9 percent guanidine nitrate, about 31.7 percent ammonium perchlorate, about 24.2 percent sodium nitrate, and about 0.2 percent silica;

A mixture comprising cellulose, nitroguanidine, ammonium perchlorate, sodium nitrate, and silica, where the mixture preferably comprises about 10 percent cellulose, about 33.7 percent nitroguanidine, about 32 percent ammonium perchlorate, about 24.1 percent sodium nitrate, and about 0.2 percent silica;

A mixture comprising cellulose, hexamine, nitroguanidine, ammonium perchlorate, sodium nitrate, and silica, where the mixture preferably comprises about 10 percent cellulose, about 10 percent hexamine, about 21.3 percent nitroguanidine, about 39.1 percent ammonium perchlorate, about 29.3 percent sodium nitrate, and about 0.3 percent silica; and A mixture comprising cellulose acetate, nitroguanidine, ammonium perchlorate, sodium nitrate, and silica, where the mixture preferably comprises about 10 percent cellulose acetate, about 31.7 percent nitroguanidine, about 33 percent ammonium perchlorate, about 25 percent sodium nitrate, and about 0.3 percent silica.

DETAILED DESCRIPTION OF THE PREFERRED EMBODIMENTS

Unless otherwise stated, all references to "percent" or "%" mean percent by weight based on the total weight of the composition.

As used herein, the term "stoichiometric balance" means that the ratio of oxidizer to fuel is such that upon combustion of the composition all of the fuel is fully oxidized, and no excess of oxygen is produced. A "near stoichiometric balance" is one in which the ratio of oxygen mass surplus or deficit to total mixture mass is within about 4 percent of a stoichiometric balance.

As used herein, the terms "low solids" and "low levels of solids" mean that, upon combustion, the gas generant produces substantially lower solids on combustion than the 60 percent solids produced by the combustion of gas generants used in prior art pyrotechnic inflators, such as sodium azide based inflators. The gas generants of the invention typically produce less than about 30 percent solids. This is advantageous in that it minimizes or eliminates the need for a filter in the inflator, thus, simplifying inflator design.

Also, as used herein, the term "cellulose" refers to polymers that are typically of the general formula $C_{6n}H_{10n}O_{5n}$, where n is the number of repeating units in the polymer chain, and includes, but is not limited to, cellulosic polymers, such as, e.g., microcrystalline cellulose, starches, such as, e.g., corn and potato starches, dextrin, and gums, such as, e.g., guar gum and xanthan gum.

The invention is directed to pyrotechnic materials comprising at least one fuel and at least one low solids producing oxidizer that may be formulated for use as low solids producing gas generants. Preferred embodiments of the invention are well suited as non-azide gas generants for use in filterless vehicle air bag inflators, that is, gas generants that do not require a metal azide as a necessary component. The compositions disclosed herein produce low levels of solids during combustion, and minimize or eliminate the need for filters or hybrid operation in inflators.

An example of a filterless inflator is provided in parent U.S. Pat. No. 5,551,725, which is incorporated herein by reference. The inflator described in the above identified application comprises a contained volume, a source of gas for producing an inflation gas, an initiating system for initiating the conversion of the source of gas to the inflation gas, and an exhaust orifice that provides an exhaust path and controls the flow of the inflation gas. The source of gas is typically a mixture of a fuel and oxidizer that is stable, and will not ignite until the initiating system ignites the mixture to produce the inflation gas.

A typical inflator functions by converting an electrical or mechanical initiating signal into the generation of a precisely controlled quantity of gas at precisely controlled rates. Generally, this is accomplished by an inflator pyrotechnic train, which comprises an "initiation" device called an initiator, an enhancer charge, and a main gas generant charge, all of which are contained in the body of the inflator. In response to the initiating signal, the initiator ignites and produces a hot gas, particulates, and/or flame. The flame output of the initiator is typically small, and often requires enhancement to ignite the main gas generant charge. The initiator flame ignites the enhancer charge, which is a hot burning propellant, and augments the initiator output sufficiently to ignite the main gas generant charge. Once ignited, the gas generant burns to produce the hot gas required at a rate sufficient to fill the air bag module in the required time.

Propellant compositions according to the invention are useful as both enhancers and gas generants. The claimed compositions provide a relatively clean gas that meets the requirements of the automotive air bag market, and produce entrained solids in a quantity that is sufficiently low so as to not require the use of filters or supplemental stored gas. Although it is desirable in many applications for both the gas generant and the enhancer to have a low solids output during combustion, it is particularly important for the gas generant, which is the principal source of gas for the inflator output.

The fuels of the invention, hexamethylene tetramine (hexamine), cellulose, and cellulose acetate, as well as nitroguanidine and guanidine nitrate, which may be mixed with the fuels of the invention, are hydrocarbons, containing only carbon, hydrogen, oxygen, and nitrogen. These fuels provide clean combustion products when properly mixed with an appropriate oxidizer. Most oxidizers used in the air bag industry produce significant quantities of solids. Therefore, the amount of solids produced by the combustion of the generant compositions of the invention is determined by the amount of oxidizer in the propellant. Hexamethylene tetramine (hexamine), cellulose, and cellulose acetate, are energetic fuels, which, when used with the appropriate oxidizer, produce sufficiently low quantities of solids to allow their use in filterless inflators.

Oxidizers useful in the invention that produce low solids are ceric ammonium nitrate, lithium nitrate, lithium perchlorate, sodium perchlorate, phase stabilized ammonium nitrate, a combination of ammonium nitrate with potassium nitrate, potassium perchlorate, or mixtures thereof, such that the combination is a solid solution, a mixture of ammonium perchlorate and at least one alkali metal salt, and mixtures thereof. The combination of ammonium nitrate with other salts in solid solution is intended to phase stabilize the ammonium nitrate. The preferred oxidizers are ceric ammonium nitrate, lithium nitrate, lithium perchlorate, sodium perchlorate, a mixture of ammonium perchlorate and at least one alkali metal salt, and mixtures thereof.

With an ammonium perchlorate oxidizer, a highly alkaline material must be produced during combustion of the gas generant to neutralize or scavenge HCl produced during combustion. Alkali metal salts useful in the invention, e.g., $Li_2CO_3$, $LiNO_3$, $NaNO_3$, and $KNO_3$, burn to form the corresponding alkali metal oxides (i.e.: $Li_2O$, $Na_2O$, and $K_2O$), which, in turn, being extremely alkaline, react with the HCl to form the alkali metal chloride and water. The metal oxides produced by the combustion of salts of metals other than the group IA alkali metals are typically not basic enough to effectively scavenge HCl. Alkali metal salts are used with an ammonium perchlorate oxidizer in the compositions of the invention to meet representative gas toxicity requirements. As one of ordinary skill in the art will recognize, an ammonium perchlorate based oxidizer system can use a single alkali metal salt or multiple alkali metal salts mixed in any proportion, as long as the total amount of alkali metal oxide produced during combustion is at least sufficient to scavenge all of the HCl produced. One of ordinary skill in the art will also recognize that an excess amount of salt can be utilized, as long as the resulting composition is low solids producing.

The preferred hexamethylene tetramine (hexamine), cellulose, and cellulose acetate gas generant fuels, which may also me mixed with at least one of RDX and/or HMX to form enhancer fuels, require a minimum amount of oxidizer, thus reducing solids production. With the appropriate choice of an oxidizer, the preferred fuels provide gas generants and enhancers that produce low solids during combustion.

For a particular fuel, a broad range of operating temperatures can be obtained by varying the oxidizer used, while maintaining a near stoichiometric balance between the fuel and oxidizer. The sodium and lithium perchlorate oxidizers provide gas generants with the highest flame temperatures, while the combination of ammonium perchlorate and lithium carbonate gives the lowest flame temperature with a particular fuel. The ammonium perchlorate/sodium nitrate system provides a flame temperature somewhere between these other systems, and, of the low hygroscopicity oxidizer systems, also provides gas generants with the lowest solids. This system provides a combination of low solids, moderate energy, and controllable hygroscopicity.

Although the gas generant compositions of the invention can function as either the main gas generant or the enhancer charge in a pyrotechnic inflator, the functions of these charges differ, which dictates differences in the formulation of the composition used for each charge.

To meet representative toxicity requirements, the sum of the charges in a vehicle air bag inflator must approach a near stoichiometric balance of oxidizer and fuel. For practical systems, the oxygen balance of the system must be within about 4 percent of the theoretical stoichiometric balance, or the gases produced will contain too much CO or $NO_x$, depending on whether excess fuel or excess oxidizer is present. However, as long as the entire system is close to a stoichiometric balance, and any divergence in the main charge is compensated for by an opposite divergence in the enhancer, the individual charges need not be in stoichiometric balance. For example, the main gas generant charge can be fuel rich if the enhancer charge is oxidizer rich, and the entire system is within about 4 percent of a stoichiometric balance. In general, however, having all charges in stoichiometric balance provides a lower level of toxic compounds in the inflator effluent gases. The fuels of the invention produce less than about 30 percent solids with the oxidizers listed above, and can produce significantly less than 30 percent solids when used with certain oxidizer combinations discussed above, such as ammonium perchlorate/sodium nitrate. Non-limiting examples of preferred, main charge gas generants that meet the requirements discussed above are listed below.

Cellulose/Ammonium Perchlorate/Sodium Nitrate
    24.4% Cellulose
    42.8% Ammonium Perchlorate
    32.5% Sodium Nitrate
    0.3% Sub-micron fumed silica.

Cellulose Acetate/Ammonium Perchlorate/Sodium Nitrate
    22.4% Cellulose Acetate
    43.9% Ammonium Perchlorate
    33.4% Sodium Nitrate
    0.3% Sub-micron fumed silica.

Hexamine/Ammonium Perchlorate/Sodium Nitrate
- 15.7% Hexamine
- 47.7% Ammonium Perchlorate
- 36.2% Sodium Nitrate
- 0.4% Sub-micron fumed silica.

Main charge gas generants further comprising guanidine nitrate or nitroguanidine that meet the requirements discussed above are listed below.

Cellulose/Guanidine Nitrate/Ammonium Perchlorate/Sodium Nitrate
- 10% Cellulose
- 36% Guanidine Nitrate
- 30.6% Ammonium Perchlorate
- 23.2% Sodium Nitrate
- 0.2% Silica Hexamine/Guanidine Nitrate/Ammonium Perchlorate/Sodium Nitrate
- 10% Hexamine
- 22.8% Guanidine Nitrate
- 38% Ammonium Perchlorate
- 28.9% Sodium Nitrate
- 0.3% Silica Cellulose Acetate/Guanidine Nitrate/Ammonium Perchlorate/Sodium Nitrate
- 10% Cellulose Acetate
- 33.9% Guanidine Nitrate
- 31.7% Ammonium Perchlorate
- 24.2% Sodium Nitrate
- 0.2% Silica Cellulose/Nitroguanidine/Ammonium Perchlorate/Sodium Nitrate
- 10% Cellulose
- 33.7% Nitroguanidine
- 32% Ammonium Perchlorate
- 24.1% Sodium Nitrate
- 0.2% Silica Cellulose/Hexamine/Nitroguanidine/Ammonium Perchlorate/Sodium Nitrate
- 10% Cellulose
- 10% Hexamine
- 21.3% Nitroguanidine
- 39.1% Ammonium Perchlorate
- 29.3% Sodium Nitrate
- 0.3% Silica Cellulose Acetate/Nitroguanidine/Ammonium Perchlorate/Sodium Nitrate
- 10% Cellulose Acetate
- 31.7% Nitroguanidine
- 33% Ammonium Perchlorate
- 25% Sodium Nitrate
- 0.3% Silica Sub-micron fumed silica, such as Cabosil®, a product of Cabot Corporation of Tuscola, Ill., is typically added to compositions containing a hygroscopic ingredient. Cabosil® and similar very fine, sub-micron particle size, high surface area fumed silicas, minimize contamination by moisture, and act as a flow aid when the compositions are in a powdered form prior to pressing into grains or pellets.

Some of the fuels of the invention do not possess very good binding characteristics, and, thus, may require a binder for the formation of pellets, grains, or granules.

The compositions listed above all are within one percent of stoichiometric balance, based upon the ratio of the mass of oxygen in the composition to the total mass of the composition. However, as noted above, a greater variation from stoichiometric balance is acceptable, as long as the oxygen balance is within about 4 percent of the theoretical stoichiometric balance.

When critical factors, such as hygroscopicity, flame temperature, mechanical stability of propellant grains, and minimum solids production, are considered, the most preferred main gas generant propellants is the composition set forth above comprising cellulose and an oxidizer comprising a mixture of ammonium perchlorate and sodium nitrate. This composition provides good ballistic performance when pressed into aspirin sized tablets, and, if properly implemented in a vehicle air bag inflator, so that significant condensation of solids occurs in the inflator, does not require an inflator filter. Tablets comprising the gas generating compositions of the invention have good mechanical strength and stability following thermal cycling. The propellants are relatively non-hygroscopic, and are readily produced under reasonable temperature and humidity conditions.

In a typical inflator, the main gas generant charge is ignited by the combustion of the enhancer charge, and both charges produce the hot gas necessary to pressurize the inflator and fill the air bag. The enhancer charge should be readily ignited by a standard initiator, even at low ambient temperatures, and should burn hot. The flame temperature should be at least as hot as those produced by the main gas generant charge, and preferably hotter. In a typical inflator, the mass of the enhancer charge is much less than that of the main gas generant charge. Accordingly, the percentage of solids produced by combustion of the enhancer charge can be higher than that of the main gas generant charge. In practice, the solids production of an enhancer charge should be less than about 50 percent, but is preferably less than about 20 percent.

As with the main propellant charge, the enhancer propellant should be close to a stoichiometric balance for oxidizer and fuel to meet the gas toxicity requirements for vehicle air bag inflators. However, a stoichiometric balance is not as critical for the enhancer propellant compared to the main gas generant because the output of the enhancer is small in comparison to the total inflator output.

Preferred enhancer charge fuels include cellulose, cellulose acetate, and hexamine are, as well as guanidine nitrate with RDX or HMX, as an energizing agent, and nitroguanidine,. An energizing agent, as used herein, refers to fuels which can be added to the compositions of the invention to increase flame temperature, and, potentially, increase burn rate and improve igniteability. Preferred, non-limiting enhancer charge compositions include the gas generating compositions listed above and the compositions listed below.

Guanidine Nitrate/RDX and/or HMX/Ammonium Perchlorate/Sodium Nitrate
- 30.0% Guanidine Nitrate
- 32.3% RDX and/or HMX
- 21.3% Ammonium Perchlorate
- 16.2% Sodium Nitrate
- 0.2% Sub-micron fumed silica.

Nitroguanidine/Ammonium Perchlorate/Sodium Nitrate
- 54.8% Nitroguanidine
- 25.6% Ammonium Perchlorate
- 19.4% Sodium Nitrate
- 0.2% Sub-micron fumed silica.

Nitroguanidine/Lithium Perchlorate
    64.8% Nitroguanidine
    34.8% Lithium Perchlorate
    0.4% Sub-micron fumed silica.

The same components used in main gas generant charge may also be used in the enhancer charge. For use in an enhancer charge, guanidine nitrate is preferably mixed with RDX or HMX to enhance the burn rate and combustion temperature of the propellant. The most preferred enhancer charges comprise the most preferred main gas generant charge compositions described above with a portion of the fuel replaced with either RDX or HMX. The preferred amount of RDX or HMX is about 15 to about 45 percent by weight, most preferably about 32 percent. To maintain a propellant that is in a near stoichiometric balance, the percentage of oxidizer must be adjusted to compensate for the change in fuel composition. The most preferred enhancer charge composition is the guanidine nitrate composition listed above.

The preferred enhancer compositions have a near stoichiometrically balanced oxidizer/fuel ratio. When used in a filterless driver side vehicle inflator, the preferred enhancer compositions are used in the form of granules.

Generally, any size vehicle air bag can be inflated in the requisite time by employing sufficient amounts of enhancer and main generant charges, where the ratio of the volume of the air bag and the required amount of gas generant is approximately constant.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments as falling within the true spirit and scope of the present invention.

We claim:

1. A low-solids gas generating composition, comprising a mixture of a fuel selected from the group consisting of cellulose, cellulose acetate, hexamine, and mixtures thereof, and an oxidizer comprising a mixture of ammonium perchlorate and at least one alkali metal salt, wherein the alkali metal salt produces an oxide upon combustion that reacts with hydrogen chloride to form an alkali metal chloride, and is present in an amount sufficient to scavenge any hydrogen chloride produced by the ammonium perchlorate during combustion, the ammonium perchlorate/alkali metal salt oxidizer and fuel are present in amounts in the oxidizer-fuel mixture, such that the ammonium perchlorate/alkali metal salt oxidizer and the fuel of cellulose, cellulose acetate, hexamine, or mixture thereof in the mixture are within about 4 percent of stoichiometric balance for a reaction between the ammonium perchlorate/alkali metal salt oxidizer and fuel, and the low-solids gas generating composition produces no more than about 30 percent solids on combustion.

2. The gas generating composition of claim 1, wherein the alkali metal salt is selected from the group consisting of lithium carbonate, lithium nitrate, sodium nitrate, potassium nitrate, and mixtures thereof.

3. The gas generating composition of claim 1, further comprising sub-micron fumed silica.

4. The gas generating composition of claim 1, wherein the fuel further comprises at least one of guanidine nitrate and nitroguanidine.

5. The gas generating composition of claim 1, wherein the gas generant is in the form of pressed pellets, grains, or granules.

6. The gas generating composition of claim 1, further comprising an energizing agent.

7. The gas generating composition of claim 6, wherein the energizing agent is selected from the group consisting of RDX and HMX.

8. The gas generating composition of claim 1, comprising cellulose and an oxidizer comprising a mixture of ammonium perchlorate and sodium nitrate.

9. The gas generating composition of claim 8, comprising from about 22 to about 28 percent cellulose and from about 72 to about 78 percent oxidizer, wherein the oxidizer comprises ammonium perchlorate and sodium nitrate in a mole ratio of about 1 mole of ammonium perchlorate to about 1 to about 4 moles of sodium nitrate.

10. The gas generating composition of claim 8, comprising about 24 percent cellulose, about 43 percent ammonium perchlorate, and about 33 percent sodium nitrate.

11. The gas generating composition of claim 1, comprising hexamine and an oxidizer comprising a mixture of ammonium perchlorate and sodium nitrate.

12. The gas generating composition of claim 11, comprising from about 14 to about 18 percent hexamine and from about 82 to about 86 percent oxidizer, wherein the oxidizer comprises ammonium perchlorate and sodium nitrate in a mole ratio of about 1 mole of ammonium perchlorate to about 1 to about 4 moles of sodium nitrate.

13. The gas generating composition of claim 11, comprising about 16 percent hexamine, about 48 percent ammonium perchlorate, and about 36 percent sodium nitrate.

14. The gas generating composition of claim 1, comprising cellulose acetate and an oxidizer comprising a mixture of ammonium perchlorate and sodium nitrate.

15. The gas generating composition of claim 14, comprising from about 20 to about 25 percent cellulose acetate and from about 75 to about 80 percent oxidizer, wherein the oxidizer comprises ammonium perchlorate and sodium nitrate in a mole ratio of about 1 mole of ammonium perchlorate to about 1 to about 4 moles of sodium nitrate.

16. The gas generating composition of claim 14, comprising about 22 percent cellulose acetate, about 44 percent ammonium perchlorate, and about 34 percent sodium nitrate.

17. The gas generating composition of claim 1, comprising cellulose, guanidine nitrate, ammonium perchlorate, sodium nitrate, and silica.

18. The gas generating composition of claim 1, comprising about 10 percent cellulose, about 36 percent guanidine nitrate, about 30.6 percent ammonium perchlorate, about 23.2 percent sodium nitrate, and about 0.2 percent silica.

19. The gas generating composition of claim 1, comprising hexamine, guanidine nitrate, ammonium perchlorate, sodium nitrate, and silica.

20. The gas generating composition of claim 1, comprising about 10 percent hexamine, about 22.8 percent guanidine nitrate, about 38 percent ammonium perchlorate, about 28.9 percent sodium nitrate, and about 0.3 percent silica.

21. The gas generating composition of claim 1, comprising cellulose acetate, guanidine nitrate, ammonium perchlorate, sodium nitrate, and silica.

22. The gas generating composition of claim 1, comprising about 10 percent cellulose acetate, about 33.9 percent guanidine nitrate, about 31.7 percent ammonium perchlorate, about 24.2 percent sodium nitrate, and about 0.2 percent silica.

23. The gas generating composition of claim 1, comprising cellulose, nitroguanidine, ammonium perchlorate, sodium nitrate, and silica.

24. The gas generating composition of claim 1, comprising about 10 percent cellulose, about 33.7 percent nitroguanidine, about 32 percent ammonium perchlorate, about 24.1 percent sodium nitrate, and about 0.2 percent silica.

25. The gas generating composition of claim 1, comprising cellulose, hexamine, nitroguanidine, ammonium perchlorate, sodium nitrate, and silica.

26. The gas generating composition of claim 1, comprising about 10 percent cellulose, about 10 percent hexamine, about 21.3 percent nitroguanidine, about 39.1 percent ammonium perchlorate, about 29.3 percent sodium nitrate, and about 0.3 percent silica.

27. The gas generating composition of claim 1, comprising cellulose acetate, nitroguanidine, ammonium perchlorate, sodium nitrate, and silica.

28. The gas generating composition of claim 1, comprising about 10 percent cellulose acetate, about 31.7 percent nitroguanidine, about 33 percent ammonium perchlorate, about 25 percent sodium nitrate, and about 0.3 percent silica.

29. A low-solids gas generating composition, comprising a mixture of a cellulose fuel and an ammonium perchlorate/alkali metal salt oxidizer, the ammonium perchlorate/alkali metal salt oxidizer consisting essentially of a mixture of ammonium perchlorate and at least one alkali metal salt, selected from the group consisting of $Li_2CO_3$, $LiNO_3$, $NaNO_3$, and $KNO_3$, wherein the alkali metal salt is present in an amount sufficient to scavenge any hydrogen chloride produced by the ammonium perchlorate during combustion, the cellulose fuel and the ammonium perchlorate/alkali metal salt oxidizer are present in amounts that provide an oxidizer-fuel mixture within about 4 percent of stoichiometric balance for a reaction between the cellulose fuel and the ammonium perchlorate/alkali metal salt oxidizer, and the low-solids gas generating composition produces no more than about 30 percent solids on combustion.

30. The low-solids gas generating composition according to claim 29, wherein the cellulose fuel is present in an amount of from about 22 to about 28 percent by weight and the ammonium perchlorate/alkali metal salt oxidizer is present in an amount of from about 72 to about 78 percent by weight, wherein the ammonium perchlorate/alkali metal salt oxidizer comprises ammonium perchlorate and sodium nitrate in a mole ratio of about 1 mole of ammonium perchlorate to about 1 to about 4 moles of sodium nitrate.

31. The low-solids gas generating composition according to claim 29, further comprising about 0.3 percent submicron fumed silica.

\* \* \* \* \*